United States Patent
Sitnik

(10) Patent No.: US 6,571,344 B1
(45) Date of Patent: May 27, 2003

(54) METHOD AND APPARATUS FOR AUTHENTICATING TIME-SENSITIVE INTERACTIVE COMMUNICATIONS

(75) Inventor: Eran Sitnik, Ossining, NY (US)

(73) Assignee: Koninklijke Philips Electronics N. V., Eindhoven (NL)

(*) Notice: Subject to any disclaimer, the term of this patent is extended or adjusted under 35 U.S.C. 154(b) by 0 days.

(21) Appl. No.: 09/469,453

(22) Filed: Dec. 21, 1999

(51) Int. Cl.[7] .............................. G06F 1/14; G06F 11/34
(52) U.S. Cl. ...................... 713/502; 713/500; 713/201; 713/178; 709/224; 702/176
(58) Field of Search ................................ 709/223, 224; 713/502, 500, 201, 178, 176; 705/14; 702/178, 176

(56) References Cited

U.S. PATENT DOCUMENTS

| | | | |
|---|---|---|---|
| 5,001,752 A | | 3/1991 | Fischer ........................ 713/178 |
| 5,189,700 A | | 2/1993 | Blandford .................... 713/178 |
| 5,223,923 A | | 6/1993 | Morales-Garza ............. 725/66 |
| 5,422,953 A | | 6/1995 | Fischer ........................ 713/172 |
| 5,500,897 A | * | 3/1996 | Hartman, Jr. ................ 713/178 |
| 5,684,526 A | | 11/1997 | Yoshinobu ................... 725/131 |
| 5,748,740 A | * | 5/1998 | Curry et al. .................. 705/65 |
| 5,822,543 A | * | 10/1998 | Dunn et al. .................. 709/224 |
| 5,936,149 A | * | 8/1999 | Fischer ........................ 73/1.43 |
| 6,078,956 A | * | 6/2000 | Bryant et al. ................ 709/224 |
| 6,108,700 A | * | 8/2000 | Maccabee et al. ........... 709/224 |
| 6,237,095 B1 | * | 5/2001 | Curry et al. .................. 713/176 |
| 6,286,046 B1 | * | 9/2001 | Bryant ........................ 709/224 |
| 6,408,388 B1 | * | 6/2002 | Fischer ........................ 713/176 |
| 6,411,998 B1 | * | 6/2002 | Bryant et al. ................ 709/224 |

FOREIGN PATENT DOCUMENTS

WO  WO 02/28053 A2 * 4/2002

* cited by examiner

Primary Examiner—Kenneth R. Coulter
(74) Attorney, Agent, or Firm—Kevin Simons

(57) ABSTRACT

A method and apparatus are disclosed for calculating and validating the differential time between the broadcasting of an event and the time at which a user responds. The event may include, for example, the announcement of an auction or a contest on a television program. The differential time for each end-user response is calculated by each end-user device. The user response can be reported back to the service provider in a secure and reliable off-line or real-time manner. Each end-user device can include a secure time-keeping device having a secure clock/calendar feature for calculating the differential time between presentation of the event and the user response. A user is prevented from recording a particular event and thereafter replaying the recorded event and responding to the replayed event, to thereby alter the effective response time. Local and global presentation time information are compared to ensure that each user responds to the initial, real-time event and not a replay.

19 Claims, 3 Drawing Sheets

METHOD AND APPARATUS FOR AUTHENTICATING TIME-SENSITIVE INTERACTIVE COMMUNICATIONS

FIELD OF THE INVENTION

The present invention relates to digital time-stamping techniques, and more particularly, to a method and apparatus for authenticating time-sensitive interactive communications, such as television events.

BACKGROUND OF THE INVENTION

The use of public or quasi-public networks, such as the Internet, for transmitting potentially sensitive or proprietary electronic communications, such as electronic mail and electronic financial transactions, is rapidly increasing. Thus, there is a growing need for improved computer security techniques that ensure the privacy or authenticity of such electronic communications. A number of techniques have been proposed or suggested for authorizing or authenticating such electronic messages or the information contained therein, and to ensure that they have not been altered.

For many electronic communications, it is important to verify the time and/or date associated with a message. Thus, techniques have been developed for associating a secure digital time-stamp with an electronic message to validate the reported time and date information. Generally, such digital time-stamps attempt to prevent a user from altering the date of an electronic message, document or transaction. According to one approach, electronic documents are signed and time stamped by an impartial third party, often referred to as a "digital notary."

In addition, U.S. Pat. No. 5,001,752 to Fischer, incorporated by reference herein, discloses a system for applying a secure time stamp to an electronic document or transaction, without the need for a "digital notary." For a general discussion of suitable encryption and security techniques, see, for example, B. Schneier, Applied Cryptography (2d ed. 1997), incorporated by reference herein.

While such previous systems for applying a digital time-stamp to electronic documents or transactions have been successful in preventing a user from altering the absolute time or date of the electronic document or transaction, they do not permit the calculation of the differential time it takes for a user to respond to a particular event. Furthermore, such previous systems for applying a digital time-stamp to electronic documents or transactions require very accurate synchronization between the central server and the distributed end-user devices.

Thus, a need exists for a method and apparatus for calculating and validating the time between an event, such as the announcement of an auction or a contest on a television program, and the time at which a user responds. A further need exists for a method and apparatus for calculating and validating the time between an event and the time at which a user responds that provides relaxed synchronization requirements.

SUMMARY OF THE INVENTION

Generally, a method and apparatus are disclosed for calculating and validating the differential time between the broadcasting of an event and the time at which a user responds. The event may include, for example, the announcement of an auction or a contest on a television program. For an illustrative television contest embodiment, the present invention determines the time between the initial presentation of the contest to the user and the time when the user responds to the contest.

The present invention permits secure, accurate and real-time multi-user events. The differential time for an end-user response is calculated by the corresponding end-user device. The response, together with the calculated differential response time, can then be reported back to the service provider in a secure and reliable real-time or off-line manner. In one embodiment, each end-user device includes a secure time-keeping device having a secure clock/calendar feature for calculating the differential time between presentation of the event and the user response. The encryption and time-stamping features of the present invention can be incorporated, for example, directly in each end-user device or in a smart card or another portable device that can be inserted into the end-user device.

Another aspect of the invention prevents the fraudulent modification of the differential time. A user is prevented from recording a particular event, for example, using a video cassette recorder (VCR), and thereafter replaying the recorded event and responding to the replayed event, thereby altering the effective response time. Thus, the present invention compares local and global presentation time information to ensure that each user responds to the initial, real-time event and not to a replay.

A more complete understanding of the present invention, as well as further features and advantages of the present invention, will be obtained by reference to the following detailed description and drawings.

DETAILED DESCRIPTION

Figure 1:
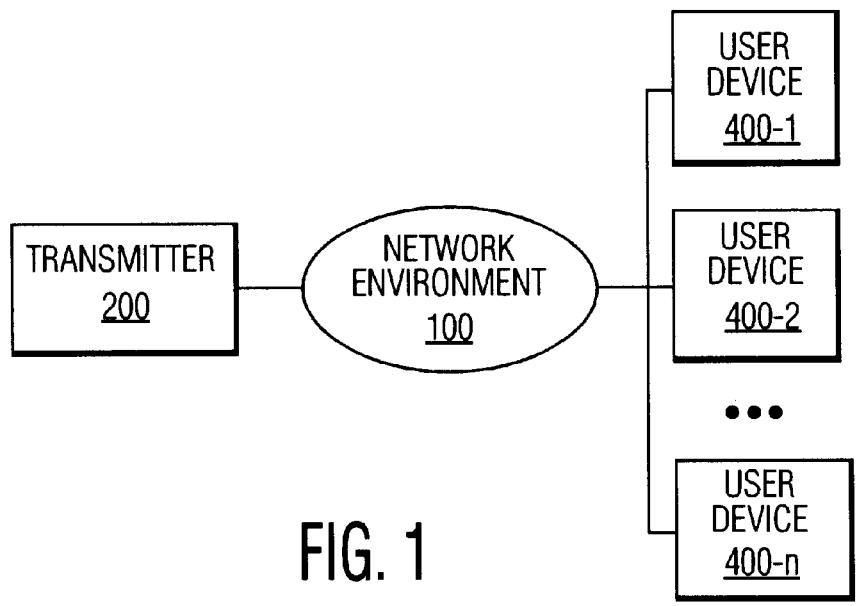
FIG. 1 illustrates a network environment in which the present invention can operate.

FIG. 1 illustrates a network environment 100 for transferring multimedia information, such as video, audio and data, from a service provider, such as a television broadcaster, using a transmitter 200, discussed further below in conjunction with FIG. 2, to one or more end-users utilizing end-user devices 400-1 through 400-n (collectively referred to hereinafter as end-user devices 400), discussed further below in conjunction with FIG. 4. The end-user devices 400 may be embodied, for example, as digital televisions, such as Philips Digital High Definition Television, model 64PH9905, commercially available from Philips Electronics N.A.

The network environment 100 may be embodied, for example, as a wireless broadcast network, such as a cellular telephone network, a terrestrial television broadcast network, or a digital satellite service (DSS) television network, or a wired network, such as the Internet, Public Switched Telephone Network (PSTN) or a cable television network, or a combination of the foregoing. While the present invention is illustrated herein in the context of a television contest, the present invention can be applied to any time-sensitive event involving a number of users communicating with a service provider over a network, as would be apparent to a person of ordinary skill in the art.

According to a feature of the present invention, the differential time it takes for a user to respond to a particular event, such as the announcement of an auction or a contest on a television program, is calculated in a secure and reliable manner by each end-user device 400. In this manner, the present invention permits fair, secure, accurate and real-time multi-user events, such as auctions, contests, games or voting. Typically, the relative time period of interest is the effective time it takes for a user to respond to the event. For example, for a television contest, the time period of interest is the time between when the contest is first presented to the user and when the user responds to the contest.

In one embodiment, discussed below, each user device 400 includes a secure time-keeping device that includes a secure clock/calendar feature for calculating the differential time between presentation of the event and the user response. Since the present invention locally and reliably computes the differential time for the user response, the response can be returned to the transmitter 200 at any time, for example, to distribute the messages received by the service provider 200 or can be sent at times of lower network traffic.

According to another feature of the present invention, a user is prevented from recording a particular event, for example, using a video cassette recorder (VCR), and thereafter replaying the recorded event and responding to the replayed event, thereby altering the effective response time. Thus, the present invention compares local and global presentation time information to ensure that each user responds to the initial, real-time event and not a replay.

Figure 2:
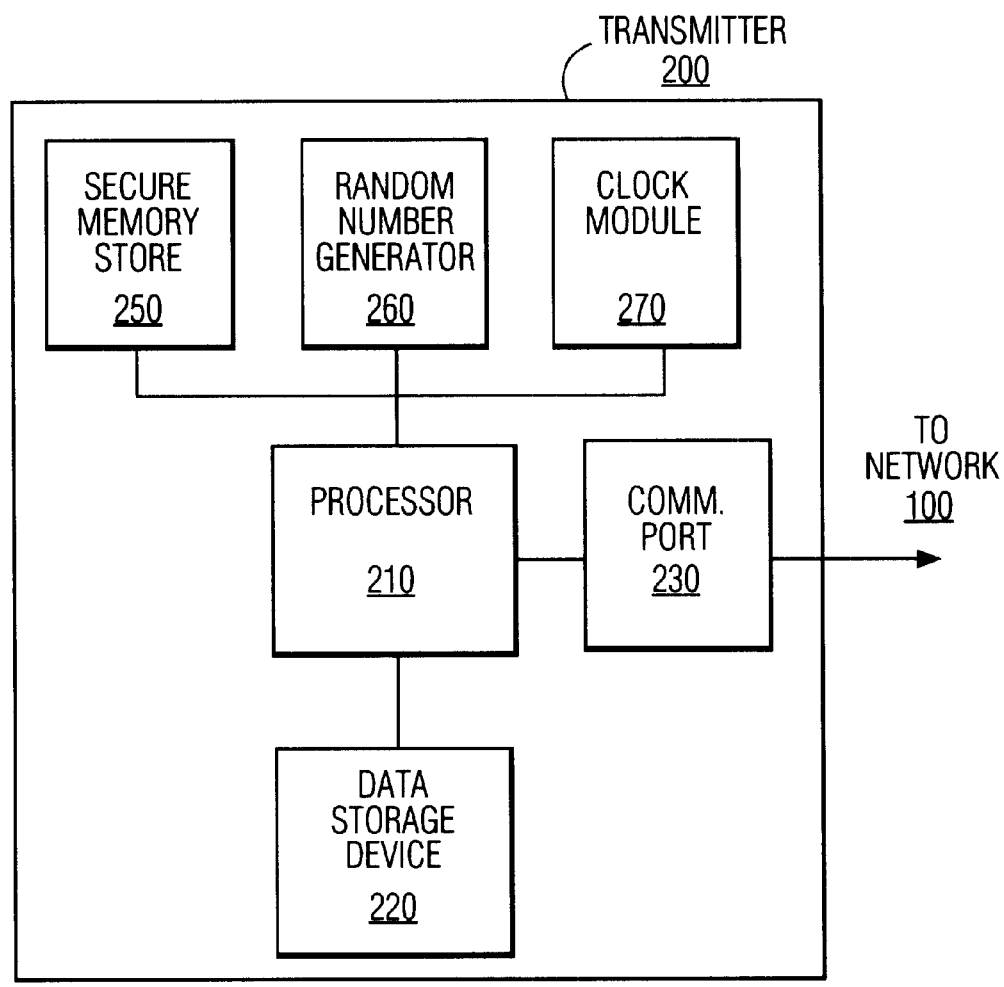
FIG. 2 is a schematic block diagram of an exemplary transmitter associated with a service provider, in accordance with the present invention.

FIG. 2 illustrates an exemplary transmitter 200 associated with a service provider 110, in accordance with the present invention. The transmitter 200 may be associated with a television network, a cable operator, a digital satellite service operator, or any service provider transmitting programming content. The transmitter 200 includes a processor 210 and related memory, such as a data storage device 220. The processor 210 may be embodied as a single processor, or a number of processors operating in parallel.

The data storage device 220 and/or a read only memory (ROM) are operable to store one or more instructions, which the processor 210 is operable to retrieve, interpret and execute. In addition, the transmitter 200 preferably includes a secure memory store 250 for recording key information, in a known manner. The secure memory store 250 records any necessary public or private key information and should be non-volatile, and tamper-resistant.

In addition, as shown in FIG. 2, the transmitter 200 preferably includes a random number generator 260, and a clock module 270. The random number generator 260 produces a random number that can be utilized in public key calculations, in a known manner. As discussed below in conjunction with FIG. 3, the clock module 270 generates time-stamp values that are transmitted with the event data. For a more detailed discussion of the encryption and time-stamp features of the transmitter 200, see, for example, U.S. Pat. No. 5,001,752 to Fischer, incorporated by reference above.

The communications port 230 connects the transmitter 200 to the network 100, thereby linking the transmitter 200 to each connected device shown in FIG. 1.

Figure 3:
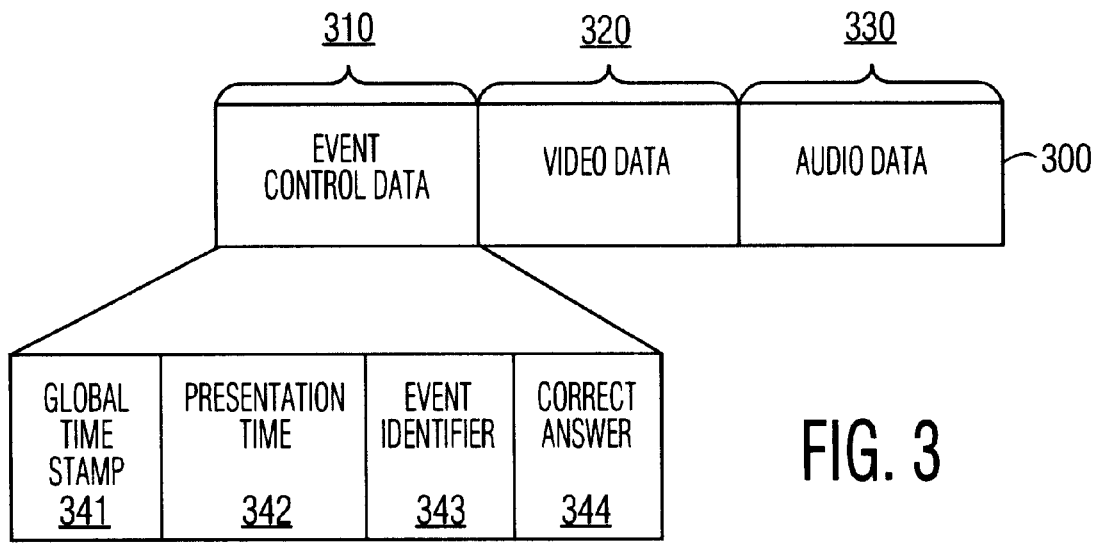
FIG. 3 illustrates an illustrative Motion Pictures Expert Group (MPEG) data stream for an illustrative television contest implementation of the present invention.

FIG. 3 illustrates an illustrative data stream 300, such as a Motion Pictures Expert Group (MPEG) stream, for an illustrative television contest implementation of the present invention. As shown in FIG. 3, the MPEG data stream 300 can include event control data 310 that is transmitted by the transmitter 200 together with the video and audio data 320, 330. The event control data 310 can include encrypted packets describing the options in the contest. For example, the event control data 310 shown in FIG. 3 includes an encrypted global time stamp (date/time) 341, presentation time (PTS) 342, relative to the System Time Clock (STS) of the overall MPEG stream 300, a event identifier 343 and, optionally, a correct answer 344. The global time stamp (date/time) 341 is the time at which the MPEG packet was sent by the transmitter 200 and the presentation time (PTS) 342 is the precise time at which the end-user device 400 should render the image on the user's display. It is noted that the MPEG data stream 300 can include a new public key at periodic intervals, in accordance with well-known conditional access techniques.

Figure 4:
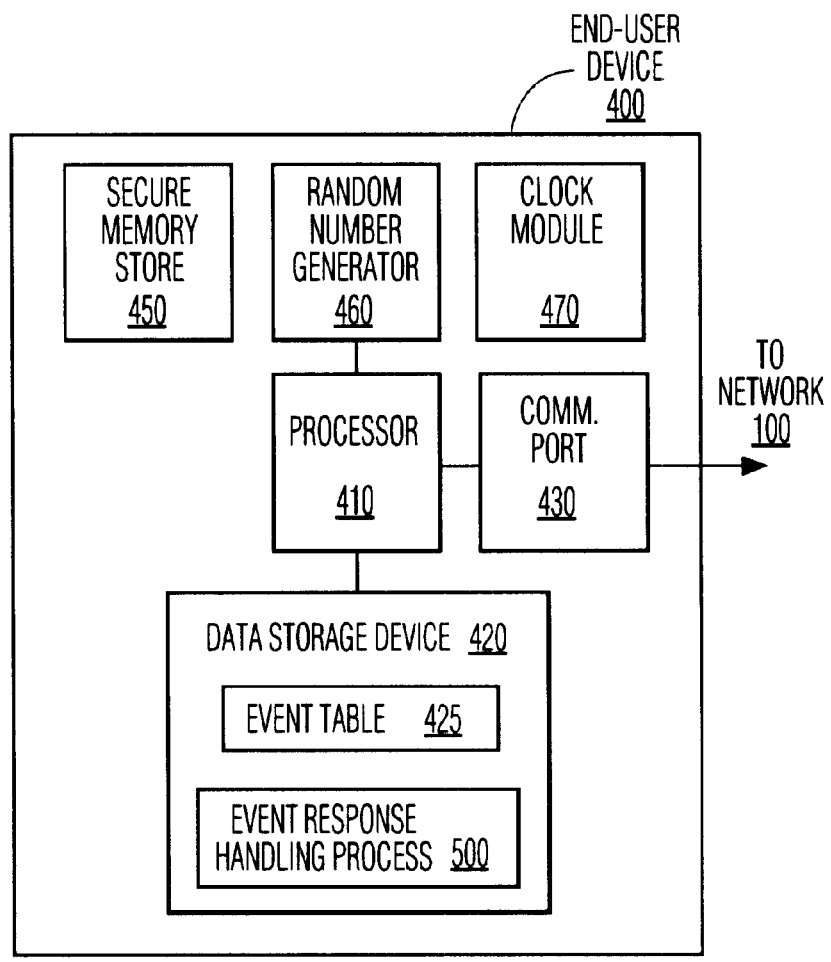
FIG. 4 is a schematic block diagram of an exemplary end user device, in accordance with the present invention.

FIG. 4 illustrates an exemplary end-user device 400, in accordance with the present invention. The end-user devices 400 may be embodied, for example, as digital televisions or personal computers. The end-user device 400 includes a processor 410 and related memory, such as a data storage device 420. The processor 410 and data storage device 420 operate in a similar manner to the processor 210 and data storage device 220 discussed above in conjunction with FIG. 2.

In addition, the end-user device 400 can include a secure memory store 450 for recording key information, in a known manner. The secure memory store 450 records any necessary public or private key information and should be non-volatile, and tamper-resistant. In addition, as shown in FIG. 4, the transmitter 400 preferably includes a random number generator 460, and a clock module 470. The random number generator 460 produces a random number that can be utilized in public key calculations, in a known manner.

As discussed below in conjunction with FIG. 5, the clock module 470 generates time-stamp values that are used to calculate the differential time between the presentation and response times of an event, in accordance with the present invention. For a more detailed discussion of the encryption and time-stamp features of the end-user device 400, see, for example, U.S. Pat. No. 5,001,752 to Fischer, incorporated by reference above. It is noted that the encryption and time-stamp features of the end-user device 400 can be incorporated, for example, in a smart card or other portable device that is inserted into the end-user device 400.

The communications port 430 connects the end-user device 400 to the network 100, thereby linking the end-user device 400 to each connected device shown in FIG. 1.

The MPEG data stream 300 shown in FIG. 3 arrives at each end-user device 400. The end-user device 400 decrypts the event control data 310 and records the information in an event table 425. Thus, the global time stamp (date/time) 341, presentation time (PTS) 342, event identifier 343 and, optionally, correct answer 344 are recorded in the corresponding fields of the event table 425.

Figure 5:
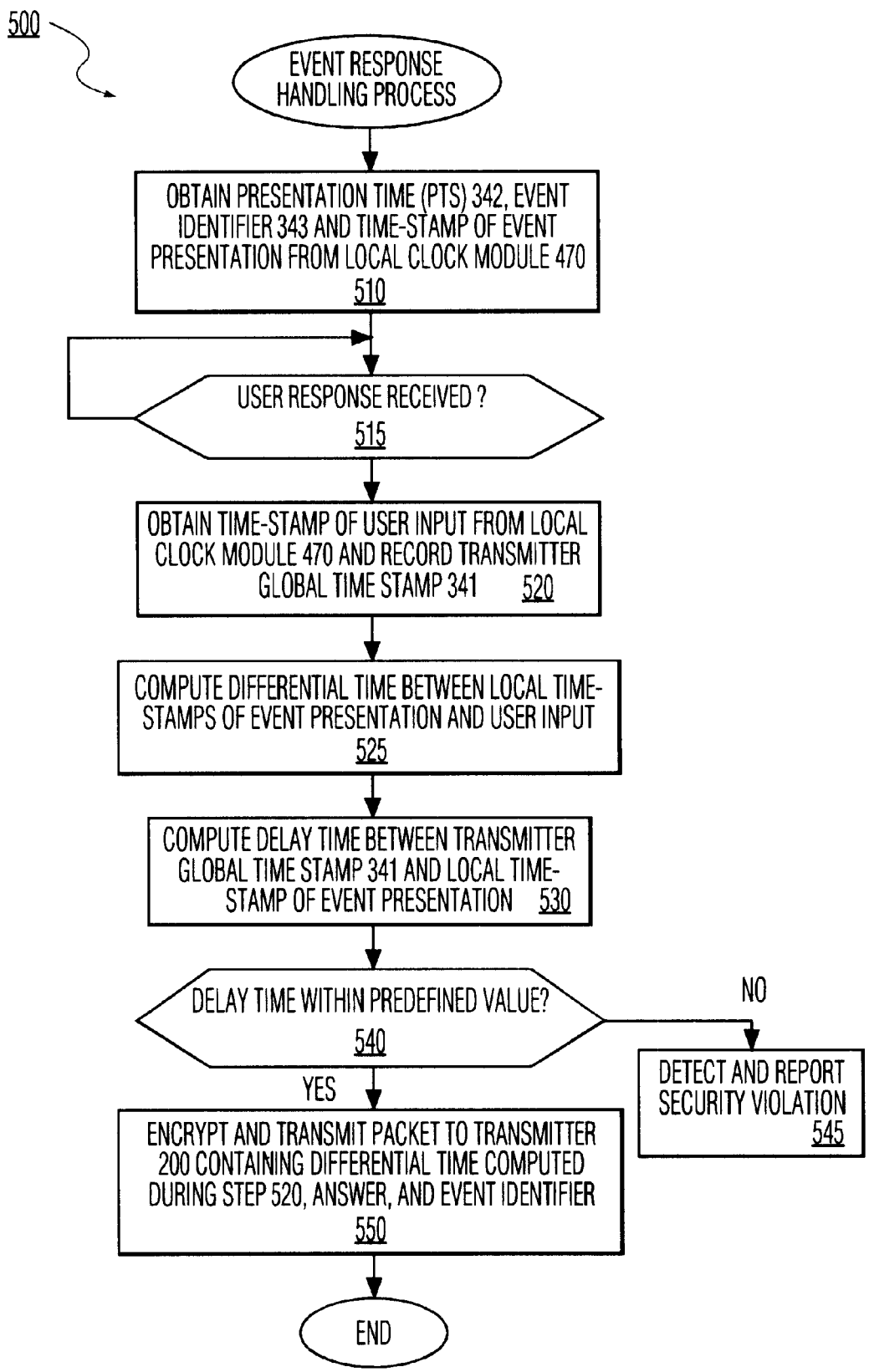
FIG. 5 is a flow chart describing an exemplary background event response handling process embodying principles of the present invention, as performed by the end-user device of FIG. 4.

The end-user device 400 includes a background event response handling process 500, discussed in conjunction with FIG. 5, that is activated during step 510 upon the receipt of an input from the user. In an alternate implementation, the background event response handling process 500 can be tailored to each event and downloaded with the MPEG data stream 300 in the form of a controlling application, such as a Java applet. The receiver 400 continues the play of the audio/video information 320, 330 included in the MPEG stream, in a conventional manner, during the execution of the background event response handling process 500.

As shown in FIG. 5, upon detecting an event, the background event response handling process 500 obtains the presentation time (PTS) 342 and event identifier 343 from the MPEG event control data 310 and obtains a local time-stamp of the event presentation from the clock module 470 during step 510. Thereafter, the background event response handling process 500 will monitor the user actions until a user response is received during step 515. Once a user response is detected during step 515, the background event response handling process 500 obtains a local time-stamp of the user response from the clock module 470 during step 520.

The background event response handling process 500 then computes the differential time between the local time-stamps of the event presentation and user response during step 525.

In addition, for additional security (to prevent responses to replayed events), the background event response handling process 500 computes the delay time during step 530 between the transmitter global time stamp 341 and the local time-stamp of the event presentation that was obtained from the clock module during step 510. It is noted that the presentation time (PTS) 342 can be utilized during step 530 in lieu of or in addition to the transmitter global time stamp 341.

A test is then performed during step 540 to determine if the delay time calculated in the previous step is within a predefined tolerance. Generally, the predefined tolerance is determined by factoring in mean-delay values through the network 100, and is intended to prevent a user from having time to respond to a replayed event. If it is determined during step 540 that the delay time exceeds the threshold then a security violation is detected during step 545. It is noted that the detection of a security violation during steps 540 and 545 can be performed by the secure receiver 400 and flagged for the service provider 200, as shown in FIG. 5, or detected by the service provider 200.

If, however, it is determined during step 540 that the delay time exceeds the threshold then the event response handling process 500 then transmits during step 550 an encrypted response packet to the transmitter 200 that contains the differential time computed during step 520, the answer, and the event identifier. In an embodiment where the event control data 310 includes the correct answer, the transmission step performed during step 540 can be conditional upon the answer being correct or another appropriate message can be sent to the service provider 200. It is further noted that the message transmitted during step 550 can be time-delayed to distribute the messages received by the service provider 200 or can be sent at times of lower network traffic.

Upon receipt of the reply message, the service provider 200 decrypts the message and compares the received differential time and answer information with recorded information for the identified event to identify a winner or otherwise validate the time it took for the user to respond.

It is to be understood that the embodiments and variations shown and described herein are merely illustrative of the principles of this invention and that various modifications may be implemented by those skilled in the art without departing from the scope and spirit of the invention.

What is claimed is:

1. A method for determining the amount of time between a transmitted event and a user response, comprising the steps of:

presenting said transmitted event to said user at an associated presentation time;

determining a local response time when said user responds to said transmitted event using a secure clock source, the secure clock source being included in a portable device inserted into an end-user device; and calculating a differential time between said presentation time and said local response time.

2. The method of claim 1, further comprising the step of transmitting a message to a provider of said transmitted event including said differential time.

3. The method of claim 2, wherein said step of transmitting a message to a provider of said transmitted event is time delayed.

4. The method of claim 2, wherein said message is encrypted.

5. The method of claim 2, wherein said message includes said response.

6. The method of claim 2, wherein said message includes an identifier of said event.

7. The method of claim 1, wherein said presentation time is obtained from control data associated with said transmitted event.

8. The method of claim 1, wherein said presentation time is obtained from a local time-stamp that is activated upon the presentation of said event to said user.

9. A method for determining the amount of time between a transmitted event and a user response, comprising the steps of:

presenting said transmitted event to said user at an associated presentation time;

determining a local response time when said user responds to said transmitted event using a secure clock;

calculating a differential time between said presentation time and said local response time; and comparing a local presentation time and a global presentation time to ensure that said response is a real-time response to said transmitted event, said comparing step ensuing that said user does not respond to a replay of said event.

10. The method of claim 9, further comprising the step of transmitting a message to a provider of said transmitted event including said differential time.

11. The method of claim 10, wherein said step of transmitting a message to a provider of said transmitted event is time delayed.

12. The method of claim 10, wherein said message is encrypted.

13. The method of claim 10, wherein said message includes said response.

14. The method of claim 10, wherein said message includes an identifier of said event.

15. The method of claim 9, wherein said secure clock source is included in a portable device inserted into an end-user device.

16. The method of claim 9, wherein said presentation time is obtained from control data associated with said transmitted event.

17. The method of claim 9, wherein said presentation time is obtained from a local time-stamp that is activated upon the presentation of said event to said user.

18. A system for determining the amount of time between a transmitted event and a user response, comprising:
   a secure clock source, the secure clock source being included in a portable device inserted into an end-user device;
   a memory for storing computer readable code; and
   a processor operably coupled to said memory, said processor configured to:
      present said transmitted event to said user at an associated presentation time;
      determine a local response time when said user responds to said transmitted event using said secure clock source; and
      calculate a differential time between said presentation time and said local response time.

19. A system for determining the amount of time between a transmitted event and a user response, comprising:
   a secure clock source;
   a memory for storing computer readable code; and
   a processor operatively coupled to said memory, said processor configured to:
      present said transmitted event to said user at an associated presentation time;
      determine a local response time when said user responds to said transmitted event using said secure clock source;
      calculate a differential time between said presentation time and said local response time; and
      compare a local presentation time and a global presentation time to ensure that said response is a real-time response to said transmitted event.

* * * * *